(12) United States Patent
Timmermans

(10) Patent No.: US 6,373,646 B1
(45) Date of Patent: Apr. 16, 2002

(54) LASER PROJECTION APPARATUS

(75) Inventor: Antonius Stephanus Maria Timmermans, Leiden (NL)

(73) Assignee: Laserpromotions Beheer B.V. i.o. (NL)

( * ) Notice: Subject to any disclaimer, the term of this patent is extended or adjusted under 35 U.S.C. 154(b) by 0 days.

(21) Appl. No.: 09/433,277

(22) Filed: Nov. 3, 1999

(30) Foreign Application Priority Data

Nov. 6, 1998 (NL) .............................................. 1010496

(51) Int. Cl.[7] .............................. G02B 5/00; G02F 5/00
(52) U.S. Cl. ...................... 359/896; 359/503; 359/506; 359/894; 372/107; 372/109
(58) Field of Search ................................ 372/107, 108, 372/109; 359/503, 506, 894, 896; 385/147

(56) References Cited

U.S. PATENT DOCUMENTS

| | | | | |
|---|---|---|---|---|
| 4,504,806 A | * | 3/1985 | Conn ........................... | 333/241 |
| 4,917,083 A | * | 4/1990 | Harrington ................... | 606/15 |
| 5,288,288 A | * | 2/1994 | Lewis .......................... | 606/14 |
| 5,397,327 A | * | 3/1995 | Koop ........................... | 606/17 |
| 5,485,225 A | | 1/1996 | Deter et al. .................. | 348/804 |
| 5,546,139 A | | 8/1996 | Bacs, Jr. et al. ............. | 348/754 |
| 5,771,260 A | * | 6/1998 | Elliot .......................... | 372/109 |
| 5,822,022 A | | 10/1998 | Deter et al. .................. | 348/750 |
| 6,026,112 A | * | 2/2000 | Hecht .......................... | 372/99 |

FOREIGN PATENT DOCUMENTS

EP 436037 A1 7/1991 ........... B23K/26/08

* cited by examiner

Primary Examiner—Darren Schuberg
Assistant Examiner—Leo Boutsikaris
(74) Attorney, Agent, or Firm—Webb Ziesenheim Logsdon Orkin & Hanson, P.C.

(57) ABSTRACT

A laser projection apparatus includes a source for generating a laser beam, various optical elements for manipulating the laser beam in order to obtain a predetermined image projection of laser light, wherein the optical elements each have at least one optical axis, and connecting elements which connect the optical elements such that the optical axes of adjacent optical elements extend coaxially, which various optical elements are accommodated in separate modules, wherein the connecting elements are formed by couplings mutually coupling the modules so that direct mutual coupling of the modules with different optical elements ensures that the optical axes thereof extend coaxially and that the whole optical system is thus aligned.

6 Claims, 2 Drawing Sheets

LASER PROJECTION APPARATUS

BACKGROUND OF THE INVENTION

The present invention relates to a laser projection apparatus comprising a source for generating a laser beam, various optical means for manipulating the laser beam in order to obtain a predetermined image projection of laser light, wherein the optical means each have at least one optical axis, and connecting means which connect the optical means such that the optical axes of the adjacent optical means extend coaxially.

With such a laser projection apparatus the laser beam generated by the laser light source is guided via mirrors, lenses, light bean distributors, colour filters and the like to a beam suppressor and/or colour mixer and then arrives at an image scanner or other manipulable beam output. Using such optical means the laser beam is deflected, has the colour changed or is otherwise manipulated in order to obtain a predetermined image projection of laser light. The laser projection apparatus finds application in laser shows, billboards, communicative displays and so on. In order to obtain the desired image projections it is important that the optical means are connected mutually and together with the laser light source such that the optical axes thereof are aligned. The laser projection apparatus known from the prior art consist of individual components, whereby it is not easily possible to bring about a correct adjustment of the optical paths over the different components. Great skill is required for this purpose, An object of the present invention is to provide a laser projection apparatus, wherein an alignment of the whole optical system can be obtained in simple manner and without great skill. Another object of the invention is to provide a laser projection apparatus which can be assembled by a user, subject to the desired image projection, in relatively simple manner and without the necessary skill.

SUMMARY OF THE INVENTION

For this purpose the laser projection apparatus is characterized according to the present invention in that the various optical means are accommodated in separate modules, wherein the connecting means are formed by couplings mutually coupling the modules. Direct mutual coupling of the modules with different optical means ensures that the optical axes thereof extend coaxially and that the whole optical system is thus aligned. The modules can be coupled in different configurations depending on the desired result.

At least one coupling preferably couples two modules for mutual rotation round the common optical axis of the two modules. The modules can be rotated and adjusted relative to each other without the optical alignment being lost.

In an advantageous embodiment the coupling is formed by a protruding part with external screw thread arranged oh the one module and a rotatably mounted ring with internal screw thread arranged on the other module. The modules can hereby be coupled to each other in simple manner, manually and without tools.

The laser beam source is preferably accommodated in a module so that the laser beam source can likewise be optically aligned with the other components of the laser projection apparatus in simple manner and without additional adjustment.

BRIEF DESCRIPTION OF THE DRAWINGS

The present invention will be further elucidated with reference to the annexed drawings. In the drawings.

DETAILED DESCRIPTION OF THE PREFERRED EMBODIMENT

Figure 1:
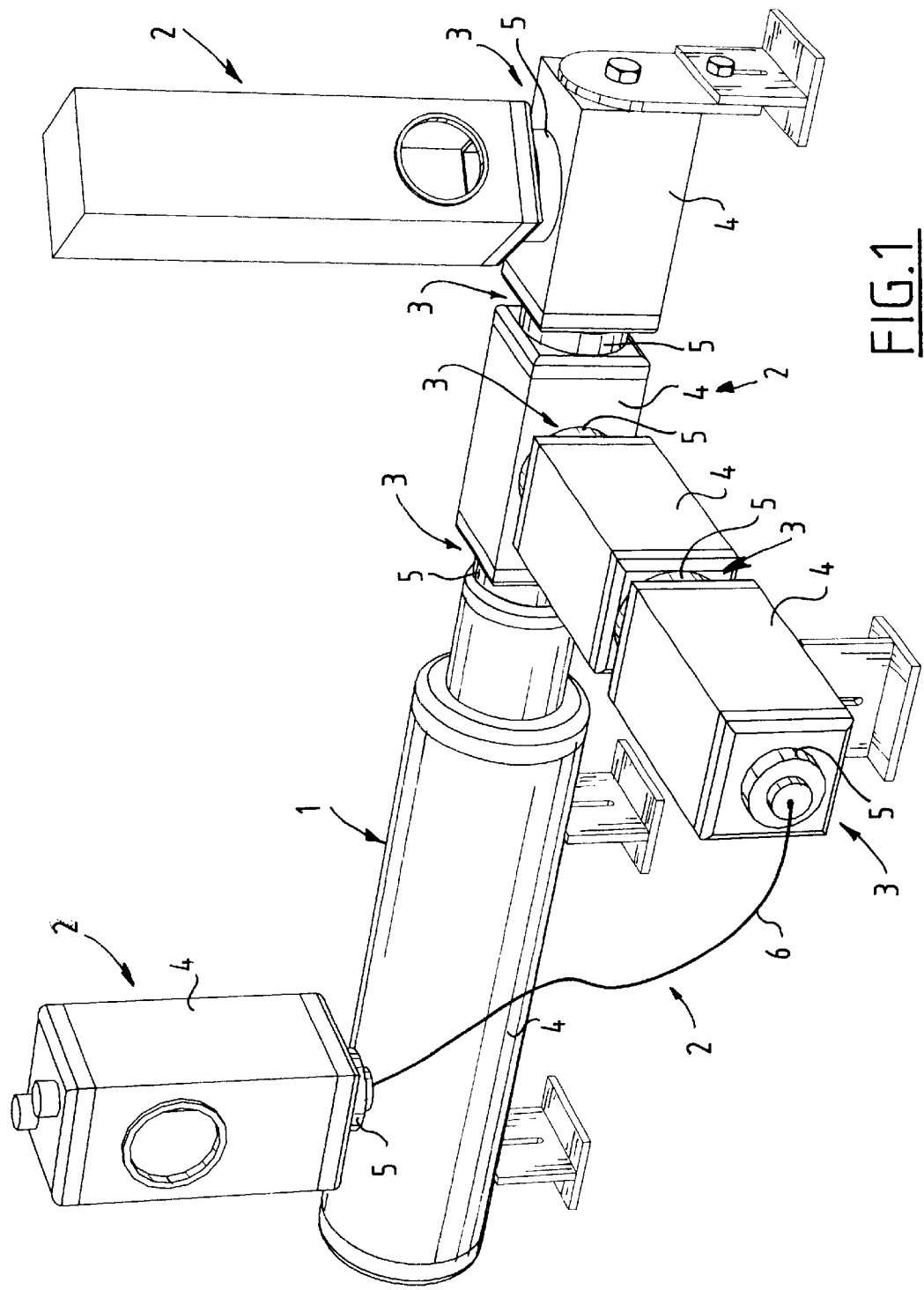
FIG. 1 shows a perspective view of a laser projection apparatus according to the present invention.

FIG. 1 shows in perspective view an example of a laser projection apparatus according to the present invention. The laser projection apparatus comprises a source for generating a laser beam 1, various optical means 2 for manipulating a laser beam in order to obtain a predetermined image projection of laser light, and releasable connecting means 3 which mutually connect the optical means. The various optical means 2, which each have at least one optical axis, and laser light source 1 are accommodated in separate modules 4. Connecting means 3 are formed by couplings 5 provided on the modules 4 which mutually and releasably couple the modules 4. Modules 4 are mutually and releasably coupled such that the optical axis of adjacent optical means 2 extend coaxially. Modules 4 can house various optical means 2, such as mirrors, light beam distributors, colour mixing crystals, X-and Y- scanners for image projection, and so on. In addition, a module is shown in FIG. 1 which is formed by a glass fibre cable 6 which is provided on the ends thereof with coupling parts 5. Module 4 can have one or more inputs and one or more outputs depending on the function of the accommodated optical means 2.

Figure 2:
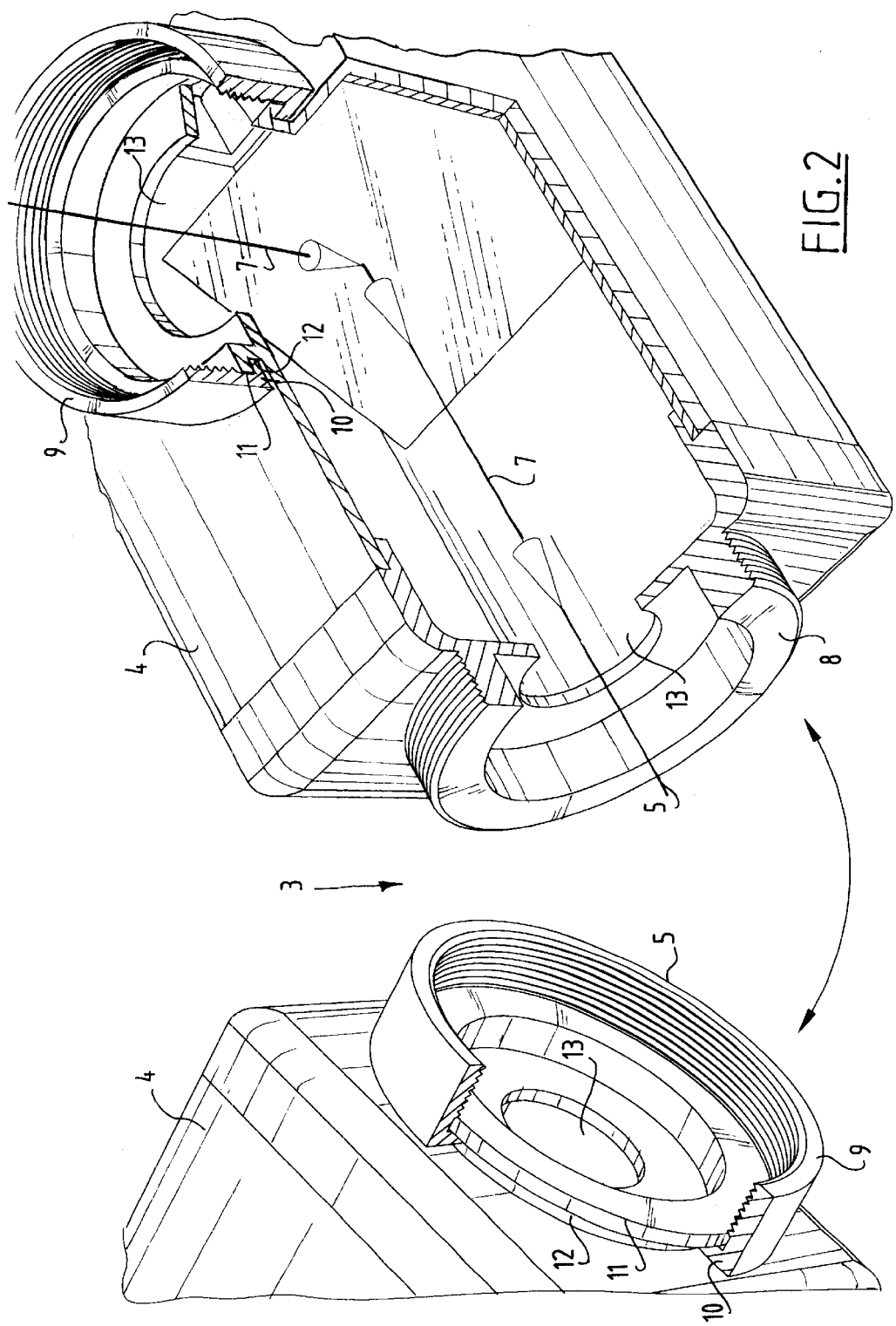
FIG. 2 shows a preferred embodiment of a coupling which couples two modules for mutual rotation round a common optical axis.

FIG. 2 shows a perspective and partly cross-sectional view of a preferred embodiment of a releasable coupling 5, which couples two modules 4 for mutual rotation round the common optical axis 7 of the two modules 4. The releasable coupling 5 is formed by a protruding part 8 with external screw thread arranged on the one module 4 and a rotatably mounted ring 9 with internal screw thread arranged on the other module 4. Ring 9 is provided on the one free end with an inward directed flanged edge 10 which co-acts with an outward directed flanged edge 11 of a protruding part 12 arranged on the other module 4. The rotatable mounting of ring 9 on module 4 is brought about in this manner. Modules 4 are mutually and releasably coupled in simple manner by screwing ring 9 over the protruding part 8. Since ring 9 is arranged in rotatably mounted manner on module 4, modules 4 can be mutually rotated and adjusted relative to each other. In addition, releasable coupling 5 ensures that the optical axes 7 of the two modules 4 extend coaxially. In FIG. 1 and 2 a module 4 is formed by a housing provided with releasable coupling parts 5 and windows 13 for a mechanical-optical connection of modules 4. The complementary releasable coupling parts 5 are preferably arranged such that it is apparent to a user which are the input(s) and which are the output(s) of a module 4. The inputs of modules 4 can thus be provided with a protruding part 12 with ring 9, and the outputs can be provided with a protruding part 8 with external screw thread (or vice versa).

According to the present invention an alignment of the optical axes of the adjacent optical means, and therefore of the whole optical system, is ensured by releasably coupling various modules in which various optical means are accommodated. The module can be mutually and releasably connected in simple manner, manually and without tools. In addition, the modules can be rotated round the common optical axis without the optical alignment being lost. By combining modules having different optical functions with each other, each laser projection apparatus for obtaining a predetermined image projection can be assembled in simple manner without specific knowledge or experience being required for this purpose.

The invention is not limited to the shown and described embodiments of the laser projection apparatus and module. Releasable couplings other than those shown are therefore possible, such as a pin/hole coupling, fixed screw coupling, clamp coupling and so on.

What is claimed is:

1. A laser projection apparatus comprising a source for generating a laser beam, a plurality of optical means for manipulating the laser beam in order to obtain a predetermined image projection of laser light, with each optical means having at least one optical axis, and releasable connecting means which releasably connect the optical means such that the optical axes of adjacent optical means extend coaxially, wherein the various optical means are accommodated in separate modules, and wherein the releasable connecting means are formed by couplings provided on the modules which mutually and releasably couple the modules directly to each other.

2. The laser projection apparatus as claimed in claim 1, wherein at least one coupling couples two modules for mutual rotation around a common optical axis of the two modules.

3. The laser projection apparatus as claimed in claim 2, wherein the coupling is formed by a protruding part with an external screw thread arranged on the one module and a rotatably mounted ring with an internal screw thread arranged on the other module.

4. The laser projection apparatus as claimed in claim 1, wherein the laser beam source is accommodated in a module.

5. A module for use in a laser projection apparatus as claimed in claim 1.

6. The module as claimed in claim 5, wherein the module is formed by a glass fibre cable provided on the ends thereof with coupling parts.

* * * * *

UNITED STATES PATENT AND TRADEMARK OFFICE
CERTIFICATE OF CORRECTION

PATENT NO. : 6,373,646 B1  Page 1 of 1
DATED : April 16, 2002
INVENTOR(S) : Antonius Stephanus and Maria Timmermans It is certified that error appears in the above-identified patent and that said Letters Patent is hereby corrected as shown below:

Column 1,
Line 14, "light bean" should read -- light beam --.
Line 29, after "for this purpose" delete comma (,) and insert period -- (.) --.
Line 54, "arranged oh" should read -- arranged on --.

Signed and Sealed this

Sixteenth Day of July, 2002

Attest:

Attesting Officer

JAMES E. ROGAN
Director of the United States Patent and Trademark Office